United States Patent [19]
Stein

[11] 4,116,543
[45] Sep. 26, 1978

[54] CONTROL ELECTRO-OPTICAL DEVICE UTILIZING LIQUID CRYSTAL

[75] Inventor: Charles R. Stein, Schenectady, N.Y.

[73] Assignee: General Electric Company, Schenectady, N.Y.

[21] Appl. No.: 139,675

[22] Filed: May 3, 1971

[51] Int. Cl.² .............................. G02F 1/13
[52] U.S. Cl. ........................ 350/333; 340/324 M
[58] Field of Search .................. 350/160 LC, 333; 340/324 R, 324 M

[56] References Cited

U.S. PATENT DOCUMENTS

| 3,322,485 | 5/1967 | Williams | 350/160 |
| 3,499,112 | 3/1970 | Heilmeier et al. | 350/160 |
| 3,575,492 | 4/1971 | Nester et al. | 350/160 |
| 3,653,745 | 4/1972 | Mao | 350/160 LC |
| 3,654,606 | 4/1972 | Marlowe et al. | 350/160 LC |

OTHER PUBLICATIONS

R. A. Soref, Solid Facts About Liquid Crystals, Laser Focus, Sep. 1970, vol. 6, #9, pp. 45–49.

*Primary Examiner*—Edward S. Bauer
*Attorney, Agent, or Firm*—Geoffrey H. Krauss; Joseph T. Cohen; Marvin Snyder

[57] ABSTRACT

A system of selectively controlling the light scattering areas or sites of nematic liquid crystal display devices of the type including a thin layer of the liquid crystal with conductors on opposite sides thereof, preferably transparent conductors, is described. The device is subjected to a frequency substantially above the critical frequency to maintain it in a non-light scattering state even in the presence of a voltage tending to render it light scattering. The particular sites to be rendered light scattering are selected by removing the high frequency voltage at those sites coincidentally with the application of a turn-on voltage to the same site. The circuit provides for a display of data which is utilized to control either the application of the turn-on voltage or the removal of the high frequency or hold-off voltage. The application of the other voltage to different cells or different conductors of the same cell is controlled sequentially and repetitively at a rate greater than that corresponding to the refresh time of the liquid crystal material.

5 Claims, 6 Drawing Figures

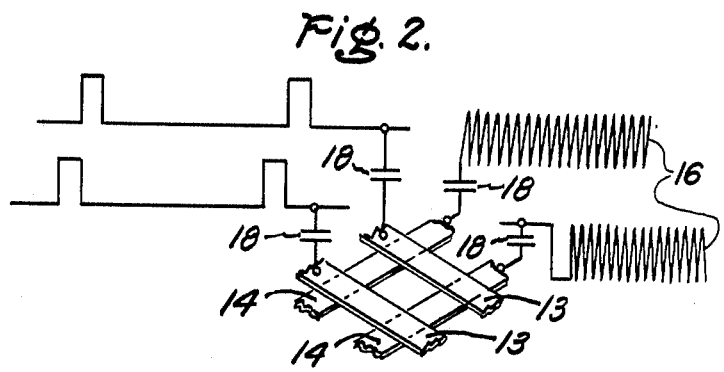
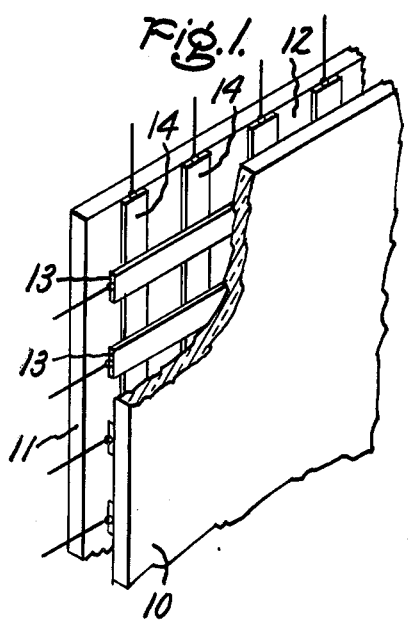
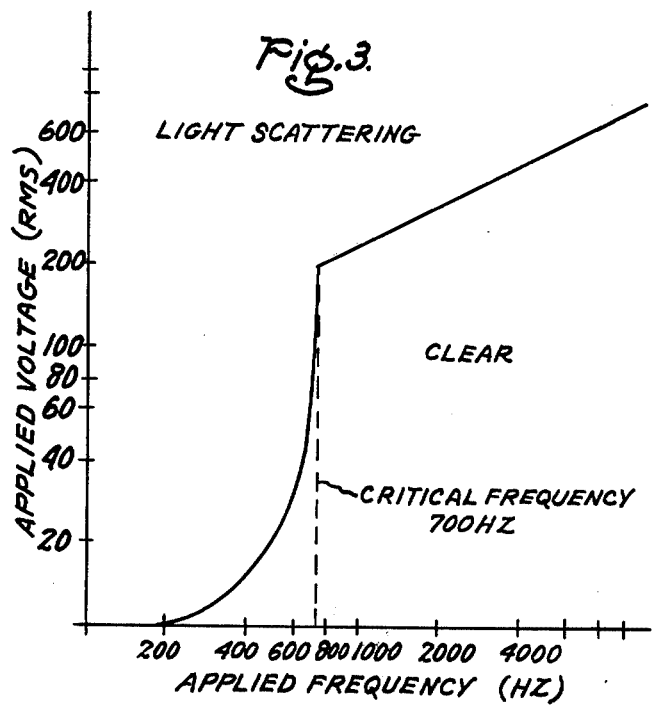
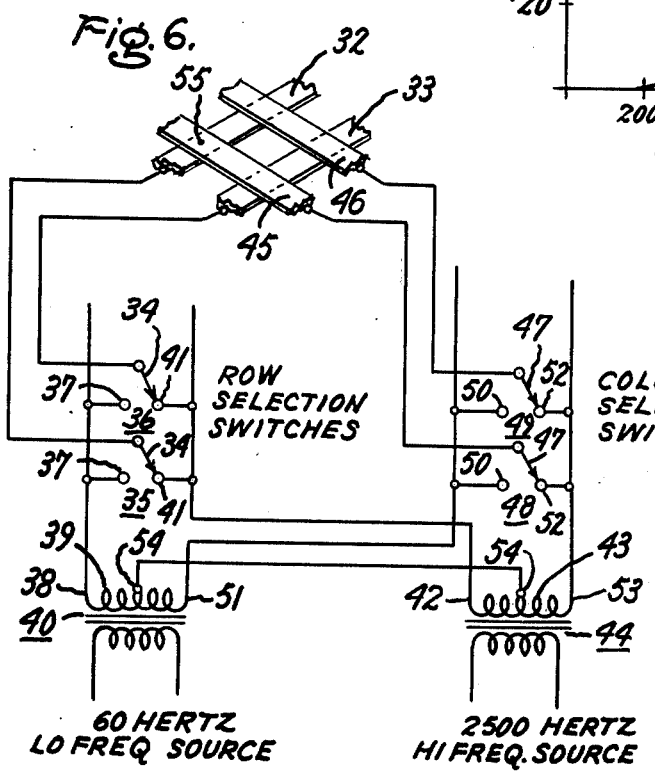

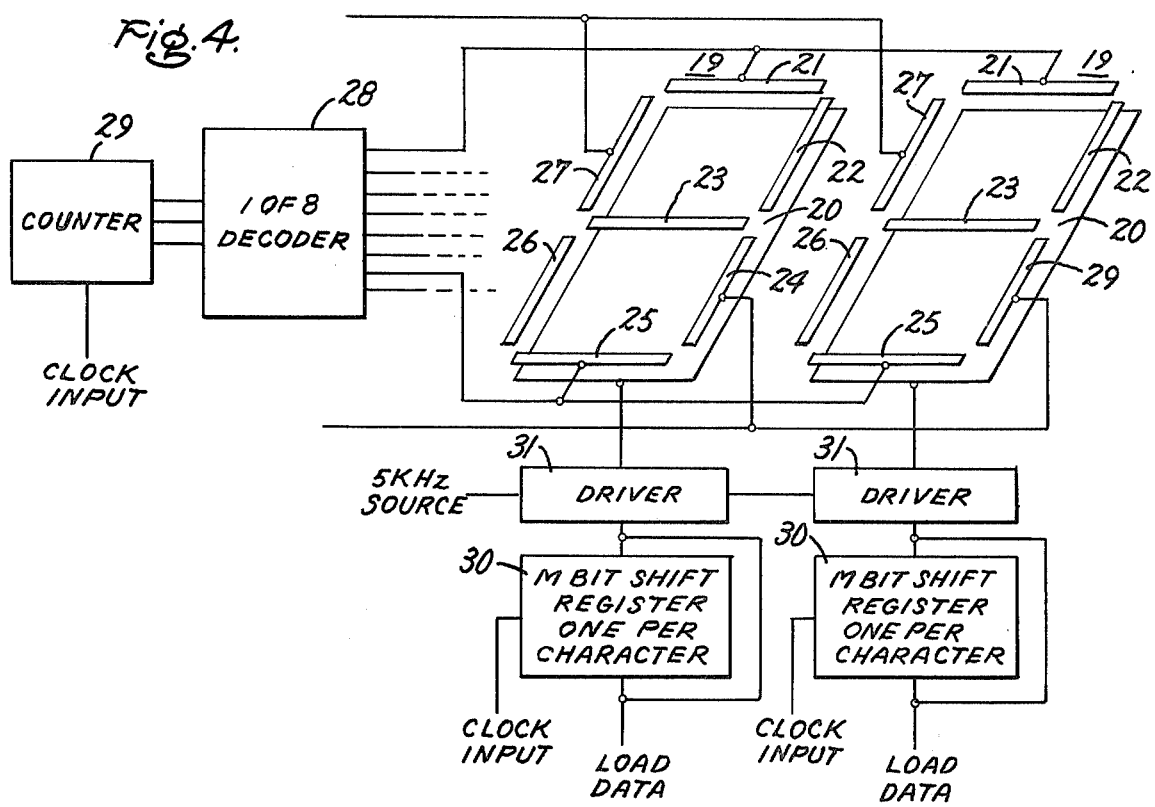
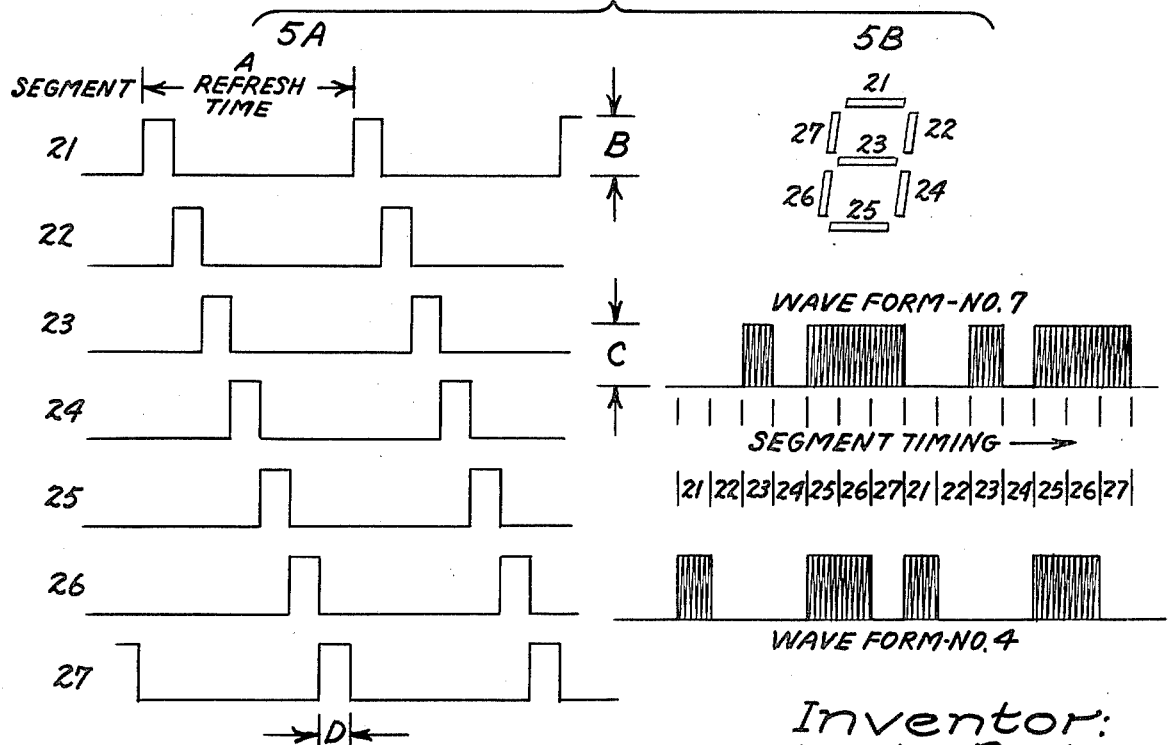

CONTROL ELECTRO-OPTICAL DEVICE UTILIZING LIQUID CRYSTAL

This invention relates to the control of the optical properties of discrete areas or sites of nematic liquid crystal cells or display devices.

There is a known class of materials known as nematic liquid crystals which exhibit properties of both solid and liquid state over a significant temperature range just above the melting point of the solid materials. Above the upper limit of the temperature range, the materials exhibit the properties of an isotropic liquid and below the lower temperature of the range the material exhibits the properties of the solid crystal. The material is said to be in the metaphoric or mesophase over the temperature range.

It is also known that such materials, when in the mesophase may be made to change from a relatively clear, light-transmissive state to a light-scattering state by subjecting a film or layer of material to an electric field exceeding a threshold value. Display devices in the form of flat cells made of glass plates separated by a thin layer of liquid crystal material have been provided with suitable conductors on opposite sides of the liquid to apply the electric field to the liquid required to change it from a clear, unexcited state to a light scattering or excited state.

While it is possible to produce a display at which each discrete area or site is individually controlled to change its state, if a large number of sites are to be controlled, the independent circuitry required becomes unduly complicated and expensive.

In accordance with an important aspect of my invention, the conductors arranged on opposite sides of the liquid crystal material are so arranged that a single conductor on one side is opposite a plurality of other conductors on the other side of the cell and the energization of the conductors are such that a plurality of sites may be considered to be in a half select condition and only the intersection at which there is a coincidence in the state of energization is the optical state of the cell changed. In other words, the present invention makes possible a type of site selection in a liquid crystal device similar in result to the matrix selection systems utilized in core memories or superconducting memory matrices. These systems depend upon a known non-linear response so that they avoid a production of a change of half amplitude in response to a half select condition.

Nematic liquid crystal material offers no such convenient non-linear effect to direct current and further the material has little or no memory capability and must be refreshed often enough to prevent flicker. However, there is a frequency threshold which can be utilized in combination with another voltage to provide a coincidence selection system. In the preferred embodiment of the invention illustrated, one set of electrodes is addressed sequentially, that is energized with a voltage pulse, without regard to data to be displayed. The other set of electrodes is addressed with a waveform which is indicative of the data to be displayed and is properly synchronized with the sequentially applied voltages. The sequential pulses are repeated at intervals which are adequate to maintain the changed condition of the cell at the selected sites, this being necessary in view of the relatively short memory capability of the material.

It is accordingly an important object of my invention to provide an improved nematic liquid crystal display system in which the light transmissive state of the material is controlled by two voltage systems applied to conductors on opposite sides of the liquid crystal material and in which the site where the optical property of the material is changed is selected by the coincidence of required voltage conditions at that site from a plurality of sites which are in a half select condition.

More specifically, the conductor or conductors on one side of the liquid are energized with a frequency substantially above the critical frequency which maintains the cell in the clear or unexcited state even though the voltage pulses tending to change the state of the cell are applied to the opposed conductors. When it is desired to change a site from a clear to a light scattering state, the high frequency voltage is removed from that site in synchronism with the applied pulse or pulses to that same site.

The objects and advantages which characterize my invention will become more apparent as the following description proceeds, reference being had to the accompanying drawing and its scope will be pointed out in the appended claims.

In the drawing:

FIG. 1 is an isometric view partially broken away showing the general construction of a nematic liquid crystal cell suitable for use in accordance with my invention;

FIG. 2 illustrates a circuit embodying my invention for energizing the mutually perpendicular conductors on the opposed faces of the cell of FIG. 1;

FIG. 3 is a curve showing the relationship between threshold voltage and frequency for a particular nematic crystal liquid material at a given temperature;

FIG. 4 illustrates two cells of a multi-cell display device including energized circuits for energizing the different segments of the cells in accordance with my invention;

FIGS. 5A and 5B illustrate the waveforms of the voltages employed for selecting a particular display on each of the cells of the system of FIG. 4; and FIG. 6 is a modified system of energization of the conductors controlling the individual sites of a device of the type shown in FIG. 1.

Referring now to FIG. 1 of the drawing, there is shown a nematic liquid crystal cell suitable for use as a display device and capable of being energized in accordance with my invention to alter the light transmitting characteristics of the crystal liquid at selected discrete areas or sites. As shown in the figure, the cell includes a pair of planar plates 10 and 11, preferably of glass, and closely spaced to provide therebetween a space for the reception of a thin film 12 of the nematic liquid crystal material. As is well understood by those skilled in the art, the edges of the cell are suitably sealed together to retain the liquid crystal material in place.

On the inner opposed faces of the glass plates 10 and 11 are arranged a plurality of conductors 13 and 14. These conductors are preferably formed by applying a thin transparent coating of conducting material, such as tin oxide, on the opposed surfaces of plates 10 and 11 and then etching these coatings to provide the arrays of conductors 13 and 14. As illustrated, the conductors of each set are parallel to each other and the conductors 14 extend in orthogonal relationship with respect to the conductors 13.

The particular nematic liquid crystal employed in this cell is not critical to the present invention and a large number of materials have been mentioned in the prior art. See, for example, the materials listed in U.S. Pat. Nos. 3,322,485 — Williams and 3,499,702 — Goldmacher et al. A particularly desirable material having a mesomorphic state near room temperature is p-methoxybenzylidene-p-n-butylanilene, hereinafter designated for convenience MBBA. This material is available commercially from Eastman Kodak, Rochester, New York. As is well understood, liquid crystal material can be doped with certain additives to control its conductivity and, accordingly, control its threshold voltage versus frequency characteristic. The thickness of the liquid between the glass plates of the cell is preferably very small, typically from 0.0005 to 0.002 inches. In cells with this thickness of liquid, the liquid material in its unexcited or non-light scattering state is relatively transparent and can be rendered light scattering by subjecting it to certain voltage conditions.

If the conductors on either side of the cell corresponding to a given site are totally independent of all other sites, it is possible to select any desired site with energization systems individual to the conductors at that site. However, as the number of addressable sites increases, this approach requires a large number of discrete energizing components and renders the system unduly complicated and expensive. In accordance with an important aspect of my invention, the conductors, such as those of the conductor arrays 13 and 14 of FIG. 1, are energized respectively with voltages of different frequency. This combination of voltages is illustrated in FIG. 2 of the drawing as applied to two conductors from each of the conductor arrays 13 and 14. The voltages applied to the two conductors of array 13 are in the form of pulses which recur at intervals of approximately one-thirtieth of a second and of sufficient time duration to refresh the cell when it is in the light scattering mode and thereby prevent flicker which would tend to result from the very short memory of liquid crystal materials. These pulses are in a specific example about 4.7 milliseconds (suitable for seven conductors) duration and have an amplitude of about 65 volts. They may be as short as 2.0 milliseconds, if desired. The pulses applied to different conductors of array 13 are displaced with respect to one another so that they occur during successive adjacent time intervals. The conductors of the array 14 are energized with a relatively high frequency wave 16, for example 5000 Hertz, with an amplitude of approximately 65 volts. When it is desired to select a site along a conductor of array 14, the high frequency voltage applied to that conductor is removed during the same time interval that a positive pulse is applied to the conductor 13 intersecting the conductor 14 at the desired site. This site then becomes excited and changes to the light scattering mode. As illustrated, the voltages are applied to conductors 13 and 14 through capacitors 18 to prevent the application of direct current to the cell and the resultant polarization of the cell.

This operation may be readily understood by considering the curve of threshold voltage versus frequency as illustrated in FIG. 3. The area below the curve represents the clear or unexcited state of the liquid crystal material and the area above the curve represents the light scattering or excited state of the liquid. The value of frequency at which the rapid rise of the characteristic ceases is called the critical or cut-off frequency and this frequency for a given material may be shifted over a substantial range by additives which change the resistivity of the material. The dopant includes an organic molecule that is readily dissociated, such as acetic acid, for example. For the doped sample of MBBA illustrated, the critical frequency is about 700 Hertz. From an inspection of FIG. 3, it is apparent that the low frequency pulse of 65 volts has frequency components, in the specific example given, of both 30 Hertz and harmonics and would, in the absence of the high frequency, render the site to which it was applied light scattering. The higher frequency applied to conductor 14 is substantially above the critical frequency, as illustrated in FIG. 3, so that the state of the liquid of the cell does not follow the voltage at this relatively high frequency and it remains clear as long as this voltage is applied. Each conductor of array 13 is energized sequentially and repetitiously with the low frequency pulse of voltage which by itself would place the liquid crystal under each conductor in turn in an excited or light scattering state and these sites may be considered to be in a half select condition. When the high frequency is removed from a conductor 14 for a time coincident with the application of a low frequency pulse on a conductor 13, the site common to those two conductors becomes light scattering. Since the pulses occur every thirtieth of a second, the cell is said to be refreshed; that is, it is restored to its light scattering state so that the selected size may be viewed without a flicker.

In FIG. 4, I have shown my invention as applied to two cells 19 of a multi-cell display system, each cell being capable of displaying alpha-numeric characters. The cells are illustrated schematically as including a planar conductor or electrode 20 on one side of the liquid crystal material and a seven segment array of conductors or electrodes 21–27, inclusive, on the other side of the liquid crystal material which may be rendered effective to change the liquid crystal material light scattering.

On the pulsed or seven segment side of the cell, the corresponding segments of all cells are connected together and to one output of a 1 of 8 decoder 28 controlled by a counter 29 which accumulates clock pulses and outputs a four-bit pattern to the 1 of 8 decoder. This type of circuit is well known and may be the same as used for driving the so-called Nixie tube displays.

The planar conductor 20 of each cell underlying the seven segments thereof are each individually energized from a driver circuit which controls the application of the high frequency voltage, which may be 5000 Hertz to the conductor. The driver circuit associated with each cell is controlled by a recirculating shift register 30 which inhibits the gate or driver circuit 31, which may be a transistor, from passing the high frequency (5 KHZ) for a period coincident with duration of the positive pulse applied to the segment at the location where it is desired to render the cell light scattering. The shift register is controlled by the same clock pulses as the counter 29 to maintain the desired coincidence between the output of decoder 28 and driver 31. The character identifying data for the character to be displayed is supplied to the input of the recirculating shift register 30 in the form of a string of off/on bits, such as supplied by the output of a character generator.

The manner in which the energizing circuit described in FIG. 4 for displaying different characters is readily understood from a consideration of the waveforms shown in FIGS. 5A and 5B. In FIG. 5A, the recurring pulses applied to the segments 21–27 by the one of eight decoder shown in FIG. 4 and in FIG. 5B the waveform of the high frequency applied to the planar conductos 20 are shown. In a specific embodiment, the refresh time A is one-thirtieth of a second, the pulse height B is 65 volts and the pulse width D is 4.7 milliseconds. The high frequency voltage applied to conductor 20 is 5000 Hertz and has an amplitude C of 65 volts.

If the upper pattern of FIG. 5B is considered to represent the waveform applied to the left-hand cell and the lower pattern to the right-hand cell, it is apparent that the display will be of the number 74. It will be noted that the high frequency wave is removed from the electrode 20 of the left-hand cell during the time intervals that the segments 21, 22 and 24 are energized by positive pulses, thus rendering the cell light scattering in the areas under these three segments to display the numeral 7 and, as shown in the lower waveform, the high frequency is removed from the plate-like conductor 20 of the right-hand cell during the intervals 2, 3, 4 and 7 corresponding to the occurrence of the positive pulses on segments 22, 23, 24 and 27, thus displaying the numeral 4.

It will be understood that the conductors 20 of a plurality of cells, such as 8 or 16 if a 1 of 16 decoder is employed, can each be sequentially energized with pulses instead of the segments 21-27 inclusive, and the high frequency from seven different sources may be applied to the segments in a data controlled time pattern; that is, the high frequency will be removed from those segments which it is desired to be displayed at the time that the planar conductor 20 of that cell is energized with a positive pulse. This amounts to reversing the energization described in connection with FIG. 4.

In FIG. 6, I have shown a modification of my invention in which a source of relatively low frequency and a source of relatively high frequency are controllably applied respectively to the row and column conductors on the opposite sides of the nematic liquid crystal display cell. As shown schematically in FIG. 6, row conductors 32 and 33 are connected respectively to the moveable contacts 34 of double throw switches 35 and 36. One fixed contact 37 of each switch is connected to one end terminal 38 of a mid-tapped secondary winding 39 of a low frequency supply transformer 40. The other fixed contact 41 of the switches 35 and 36 are connected to one end terminal 42 of the mid-tapped secondary winding 43 of a high frequency supply transformer 44. In a similar manner, the column conductors 45 and 46 are connected respectively to the moveable contacts 47 of single pole double throw switches 48 and 49. One fixed contact 50 of each of the switches 48 and 49 is connected with the other end terminal 51 of the secondary winding 39 of the low frequency supply transformer 40 and the other fixed contacts 52 are connected with the other end terminal 53 of the secondary winding 43 of the high frequency supply transformer 44. The mid-taps 54 of the secondary windings 39 and 43 are connected together.

Thus, with moveable contacts 34 and 47 of all four switches in the position shown, both the row conductors 32 and 33 are connected with the left-hand terminal 38 of the secondary winding of the high frequency supply transformer 40 and the column conductors 45 and 46 are connected to the right-hand terminal 53 of the secondary winding 43 of the high frequency supply transformer 44. Under these conditions, only the high frequency voltage is applied across all of the controllable sites of the cell and all of the cell is in an unexcited or clear state. If, for example, contact 47 of switch 48 is moved to its left-hand position, the high frequency voltage is removed from column conductor 45 and that conductor connected to the right-hand terminal 51 of low frequency transformer 40. If, in a like manner, the moveable contact 34 of switch 35 is moved to its left-hand position, row conductor 32 is energized from the low frequency supply and the high frequency supply is removed, thus rendering the area 55 at the left-hand corner of the cell between row conductor 32 and column conductor 45 light scattering. It is apparent that the number of column and row conductors may be increased and a similar control extended to select any desired site.

In FIG. 6, the low frequency voltage has been indicated as of 60 Hertz and the high frequency voltage as 2500 Hertz. While the exact value of these frequencies is not important, it is important that they be substantially below and above the critical frequency respectively which, for the particular material used in the examples given, is about 700 Hertz.

It is apparent from the foregoing detailed description that my invention makes use of the non-linear voltage frequency characteristic of nematic liquid crystal materials to utilize a coincidence type of selection system in connection with cells or display devices using such material. In accordance with these embodiments, the cell is maintained in a non-light scattering state by the application of a voltage having a frequency above the critical or cut-off frequency to one conductor or systems of conductors on one side of the cell and to remove that voltage from a conductor or group of conductors to render a site or group of sites selectable by the application of a turn-on voltage to a selected segment or group of segments on the opposite side of the cell. The frequency and magnitude of the turn-on pulse is such as to render the cell light scattering in the absence of the high frequency voltage but not to do so in the presence of the high frequency voltage. The high frequency voltage is removed coincidentally with the application of the turn-on voltage at selected sites.

What I claim as new and desire to secure by Letters Patent of the United States is:

1. A liquid crystal display system comprising a thin layer of liquid crystal material which produces substantially no light scattering when in an unexcited state and a substantial amount of light scattering when in an excited state, a plurality of elongated conductors extending in parallel relation to each other on each side of the liquid crystal material with the conductors on one side extending orthogonally with respect to the conductors on the other side to provide a matrix of sites between opposed conductors, means for energizing all the conductors on one side of the liquid crystal material with a voltage having a frequency above the critical frequency of the liquid crystal material, means for simultaneously energizing successive ones of the plurality of conductors on the other side of said material during successive adjacent time periods with recurring voltage pulses having a frequency below the critical frequency and having a repetition rate in excess of that corresponding to the refresh time of the liquid crystal material, and means for removing the high frequency voltage from selected conductors on said one side of said material coincidentally with the application of the selected voltage pulses to conductors on the other side of said material to render selected sites light scattering.

2. A liquid crystal display system comprising a layer of liquid crystal material which produces substantially no light scattering when in an unexcited state and a substantial amount of light scattering when in an excited state, a first conductor on one side of said liquid crystal material, a plurality of conductors on the opposite side of said liquid crystal material having at least portions thereof in opposed relation to said first conductor, means for applying to said first conductor a high frequency voltage having a frequency above the critical frequency of said liquid crystal to maintain said light crystal material in an unexcited state, means for selelctively energizing successive ones of said plurality of conductors during successive adjacent time periods with a turn-on voltage which is a recurring voltage pulse having a repetition rate in excess of that corresponding to the refresh time of the liquid crystal material and a frequency below said critical frequency, said high frequency voltage maintaining said display system in a substantially non-light scattering condition during a simultaneous application of said turn-on voltage, and means for removing said high frequency voltage from said first conductor substantially coincidentally with the application of said turn-on voltage to a selected one of said plurality of conductors to render said layer of liquid crystal material light scattering in the region between said first conductor and the selected one of said plurality of conductors.

3. A liquid crystal display system comprising a plurality of liquid crystal cells, each of said cells comprising a layer of liquid crystal material which produces substantially no light scattering when in an unexcited state and a substantial amount of light scattering when in an excited state, a first conductor on one side of said liquid crystal material, a plurality of conductors on the opposite side of said liquid crystal material in opposed relation to said first conductor; means for sequentially and repetitively energizing each successive one of said plurality of conductors of each of said cells during successively adjacent time periods with a turn-on voltage having a frequency below the critical frequency of said liquid crystal material, means for applying a high frequency voltage to said first conductor of each of said cells, said high frequency voltage having a frequency above the critical frequency of said liquid crystal to maintain said liquid crystal material of each of said cells in an unexcited state even in the presence of said turn-on voltage, and means controlled by data to be displayed for removing said high frequencies voltage from said first conductor of each of said cells during the periods of energization of selected ones of said plurality of conductors with said turn-on voltage to render the layer of liquid crystal of each of said cells light scattering in the regions between said first conductor of each and the selected ones of said plurality of conductors in accordance with said data.

4. The liquid crystal display system of claim 3 further comprising means for independently controllably applying the high frequency voltage to corresponding conductors of said plurality of conductors as said turn-on voltage is sequentially and repetitiously applied to said first conductor of each of said cells.

5. The liquid crystal display system of claim 4 wherein the high frequency voltage is removed from selected conductors of each cell coincidentally with the application of the turn-on voltage to said first conductor of each cell to determine the pattern of light scattering sites on each cell in accordance with the data to be displayed.

* * * * *